(12) United States Patent
Nahill et al.

(10) Patent No.: US 7,303,796 B2
(45) Date of Patent: Dec. 4, 2007

(54) PREFORM ASSEMBLY, CONTAINER ASSEMBLY AND METHOD OF MANUFACTURE

(75) Inventors: Thomas E. Nahill, Amherst, NH (US); Brian A. Lynch, Merrimack, NH (US); Keith J. Barker, Candia, NH (US)

(73) Assignee: Graham Packaging PET Technologies Inc., York, PA (US)

( * ) Notice: Subject to any disclaimer, the term of this patent is extended or adjusted under 35 U.S.C. 154(b) by 0 days.

(21) Appl. No.: 10/613,445

(22) Filed: Jul. 3, 2003

(65) Prior Publication Data

US 2005/0003123 A1    Jan. 6, 2005

(51) Int. Cl.
*B29D 22/00* (2006.01)
*B29D 23/00* (2006.01)
*B32B 1/08* (2006.01)

(52) U.S. Cl. ............... 428/35.7; 428/36.9; 428/542.8; 264/521; 264/532; 264/901; 264/903; 264/296; 215/44; 215/274

(58) Field of Classification Search ............... 428/36.9, 428/35.7, 542.8; 264/521, 532, 533, 901, 264/903, 296; 215/44, 274
See application file for complete search history.

(56) References Cited

U.S. PATENT DOCUMENTS

| | | | |
|---|---|---|---|
| 2,415,609 A | 2/1947 | Sebell | |
| 3,048,889 A | 8/1962 | Fischer | |
| 3,086,249 A | 4/1963 | Nelson et al. | |
| 3,124,273 A | 3/1964 | Remington | |
| 3,164,646 A | 1/1965 | Fisher | |
| 3,278,664 A | 10/1966 | Langecker | |
| 3,311,950 A | 4/1967 | Strauss | |
| 3,457,592 A | 7/1969 | Winchester | |
| 3,603,472 A | 9/1971 | Lecinski | |
| 3,649,150 A | 3/1972 | Gilbert | |
| 3,695,805 A | 10/1972 | Gilbert | |
| 3,769,394 A | 10/1973 | Latreille | |
| 3,899,096 A | 8/1975 | Marco | |
| 4,065,535 A | 12/1977 | LeGrand | |
| 4,116,607 A | 9/1978 | LeGrand | |

(Continued)

FOREIGN PATENT DOCUMENTS

DE    1299406    7/1969

(Continued)

OTHER PUBLICATIONS

International Search Report mailed Nov. 22, 2004 in corresponding PCT Application No. PCT/US2004/021355.

(Continued)

*Primary Examiner*—Michael Miggins
(74) *Attorney, Agent, or Firm*—Rissman Jobse Hendricks & Oliverio LLP

(57) ABSTRACT

A finish on a hollow plastic preform or container includes a neck that is at least partially of crystallizable polymer construction and is at least partially crystallized, and a finish ring externally secured over the neck. The neck preferably is of molded plastic construction, and preferably is stretched subsequent to molding but prior to external securement of the finish ring. In the preferred embodiments of the invention, the preform or container has an integral body, and the neck is integrally molded with the body. The finish ring preferably has at least one external thread for securement of a closure to the container after molding.

48 Claims, 3 Drawing Sheets

U.S. PATENT DOCUMENTS

| | | |
|---|---|---|
| 4,119,394 A | 10/1978 | Cary |
| 4,126,658 A | 11/1978 | Rupert |
| 4,158,692 A | 6/1979 | Nilsson |
| 4,293,520 A | 10/1981 | Akutsu |
| 4,297,306 A | 10/1981 | Yoshino |
| 4,341,317 A | 7/1982 | Suzuki |
| 4,382,769 A | 5/1983 | Younkin |
| 4,386,046 A | 5/1983 | Yoshino |
| 4,397,629 A | 8/1983 | Akutsu |
| 4,412,966 A | 11/1983 | Yoshino |
| 4,442,063 A | 4/1984 | Younkin |
| 4,499,044 A | 2/1985 | Hone |
| 4,578,028 A | 3/1986 | Dirksing |
| 4,591,060 A * | 5/1986 | Tsukada et al. ............... 215/42 |
| 4,607,757 A | 8/1986 | Lecinski |
| 4,609,516 A | 9/1986 | Krishnakumar et al. |
| 4,704,243 A | 11/1987 | Nilsson et al. |
| 4,710,118 A | 12/1987 | Krishnakumar et al. |
| 4,929,410 A | 5/1990 | Meyer |
| 4,954,376 A | 9/1990 | Krishnakumar et al. |
| 5,762,970 A | 6/1998 | Takashima et al. |
| 5,833,085 A | 11/1998 | Valyi |
| 5,884,786 A * | 3/1999 | Valyi ............................ 215/44 |
| 6,068,811 A | 5/2000 | Koda |
| 6,228,317 B1 | 5/2001 | Smith |
| 6,238,200 B1 | 5/2001 | Spoetzl |
| 6,413,600 B1 * | 7/2002 | Slat ............................ 428/35.7 |
| 6,811,845 B2 * | 11/2004 | Nahill et al. ............... 428/35.7 |
| 2004/0146673 A1 * | 7/2004 | Larsen ....................... 428/35.7 |
| 2004/0166264 A1 | 8/2004 | Nahill et al. |

FOREIGN PATENT DOCUMENTS

| | | |
|---|---|---|
| EP | 0503086 A | 9/1992 |
| GB | 1339335 | 12/1973 |
| GB | 2212435 A | 7/1989 |
| IT | 713736 | 9/1966 |
| JP | 52-103283 | 8/1977 |
| JP | 521977-103283 | 8/1977 |
| JP | 54-085260 A | 7/1979 |
| JP | 62-164504 | 7/1987 |
| JP | 03-092329 | 4/1991 |
| WO | WO 97/25192 A | 7/1979 |
| WO | WO 02/00418 A1 | 1/2002 |

OTHER PUBLICATIONS

International Search Report mailed Jul. 20, 2004 in PCT Application No. PCT/US2004/005889.

International Search Report mailed Jul. 9, 2004 in PCT Application No. PCT/US2004/001841.

* cited by examiner

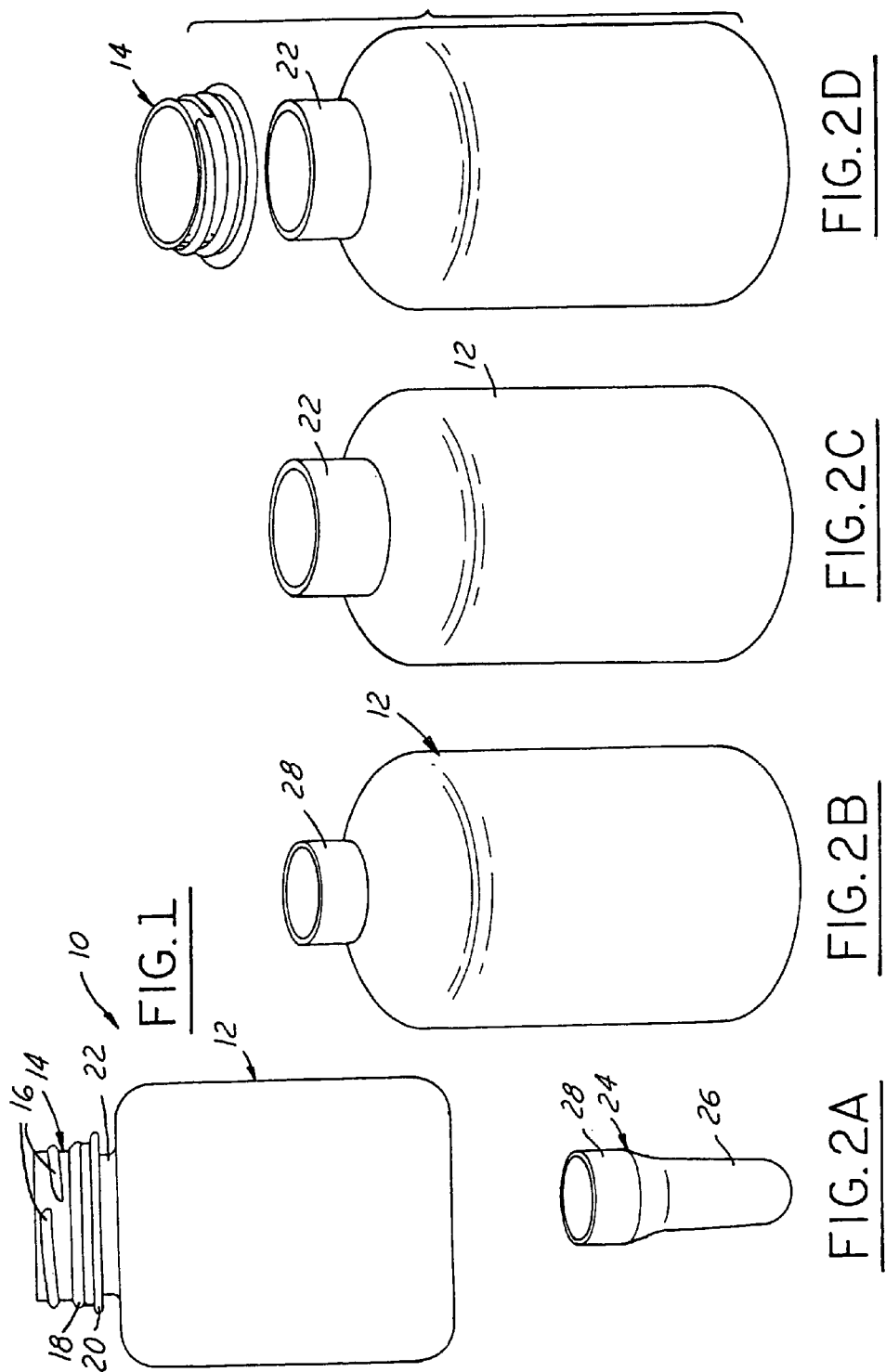

PREFORM ASSEMBLY, CONTAINER ASSEMBLY AND METHOD OF MANUFACTURE

The present invention is directed to preforms for blow molding plastic containers, to containers blow molded from such preforms, and to methods of making such preforms and containers.

BACKGROUND AND SUMMARY OF THE INVENTION

In the manufacture of plastic containers, it is conventional to injection mold or compression mold a container preform having a body and a finish with one or more external threads. The finish typically is molded to its final geometry, while the body of the preform is subsequently blow molded to the desired geometry of the container body. The preform may be of monolayer construction, or may be of multilayer construction in which one or more intermediate layers in the preform body may or may not extend into the finish area of the preform. U.S. Pat. Nos. 4,609,516, 4,710,118 and 4,954,376 illustrate injection molding of multilayer container preforms. It has been proposed to strengthen and rigidify the finish portion of the container by crystallizing all or selected portions of the neck finish. See, for example, U.S. Pat. Nos. 4,618,515, 4,928,835 and 6,217,818. The uncrystallized portions of the container body and finish typically are translucent, while the crystallized portion(s) of the finish contain spherulite that has a milky opaque appearance.

Molding the finish portion of the container as part of the preform presents a number of problems. For example, when the preforms are formed by injection molding, the plastic material typically is injected into a mold cavity at the closed end of the preform body, so that the material must flow along the sides of the preform cavity into the area in which the finish is molded. The finish typically requires more accurate and stable dimensioning than the body of the preform, which may limit the cycle time of the molding process. Furthermore, the finish portion of the preform is of the same material as at least the outer layers of the preform body, which limits the ability to obtain the most desirable characteristics at the finish. When the preform is of polyester construction, such as polyethylene terephthalate (PET), the finish portion of the preform can be wholly or partially crystallized to improve the operating characteristics of the finish area, particularly in hot-fill container applications. However, the requirement that the finish be of the same material as at least the outer layers of the preform body still limits the design capabilities of preform manufacture.

A finish on a hollow plastic preform or container, in accordance with a first aspect of the present invention, includes a neck that is at least partially of crystallizable polymer construction and is at least partially crystallized, and a finish ring externally secured over the neck. The neck preferably is of molded plastic construction, and preferably is stretched subsequent to molding but prior to external securement of the finish ring. In the preferred embodiments of the invention, the preform or container has an integral body, and the neck is integrally molded with the body. The finish ring preferably has at least one external thread for securement of a closure to the container after molding.

A method of making a finish on a hollow plastic preform or container, in accordance with another aspect of the present invention, includes providing a molded plastic neck that is at least partially of crystallizable polymer construction, circumferentially expanding the neck, and at least partially crystallizing the neck after expansion. A finish ring is then externally secured to the neck subsequent to expanding the neck.

The term "crystallizable polymer" in the present application refers to any polymer that is capable of being crystallized. These polymers include not only polyesters such as PET, which is the crystallizable polymer most typically used to make containers, but also polyolefins such as polyethylenes and polypropylenes, polycarbonates and polyamides such as nylons. Thus, although specific embodiments of the invention are disclosed in conjunction with polyesters—i.e., PET—the invention is by no means limited specifically to this polymer or family of polymers.

Likewise, when referring in the present application to preforms or containers that are at least partly of crystallizable polymer construction, or to preforms or containers of crystallizable polymer construction, such language refers not only to containers that are entirely of crystallizable polymer construction, but also to multilayer containers in which at least the inside and/or outside layer is of crystallizable polymer construction. Intermediate layers of the container or preform may include barrier materials against migration of gases through the container walls, layers of process regrind and/or layers that include post consumer resin. These intermediate layers may be included only in the body of the container, such that the container finish is of unlayered polymer construction, or may extend into the finish of the container. See, for example, U.S. Pat. Nos. 4,550,043, 4,609,516, 4,781,954, 4,990,301 and 5,098,274.

BRIEF DESCRIPTION OF THE DRAWINGS

The invention, together with additional objects, features, advantages and aspects thereof, will be best understood from the following description, the appended claims and the accompanying drawings, in which:

FIG. 1 is an elevational view of a container assembly in accordance with an exemplary presently preferred embodiment of the invention;

FIGS. 2A-2D illustrate sequential stages of fabrication of the container of FIG. 1 in accordance with one aspect of the present invention;

DETAILED DESCRIPTION OF THE PREFERRED EMBODIMENTS

Figure 3C:
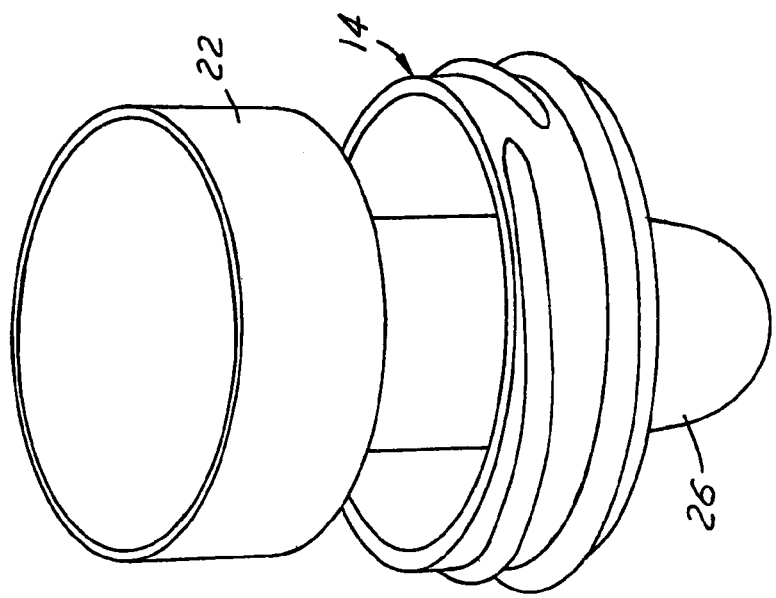
FIGS. 3A-3C illustrate sequential stages of fabrication of the container of FIG. 1 in accordance with another aspect of the present invention.

FIG. 1 illustrates a container assembly 10 in accordance with one aspect of the present invention as including a body 12 and a finish 14. Body 12 may be of any suitable geometry, with a cylindrical body being shown for purposes of illustration only. Finish 14 includes suitable closure securement means, such as one or more external threads or thread segments 16. The illustrated finish 14 also includes a bead 18 for cooperating with tamper-indicating means on a closure, and a capping flange 20. In accordance with the present invention, finish 14 is provided separately from container 12, and is externally secured to the neck 22 of container 12 after circumferential and radial expansion of the underlying neck, and either prior to or subsequent to blow molding container body 12. Expansion of the preform neck prior to or subsequent to blow molding the container body has the advantage of at least partially molecularly orienting the neck when the preform is of orientable construction such as PET. Furthermore, throughput of the preform molding operation is increased as compared with molding preforms having enlarged necks.

FIGS. 2A-2D illustrate one method of fabricating container 12 in accordance with the present invention. A preform 24 is first formed by injection or compression molding. Preform 24 includes a body 26 that is subsequently blow molded to form body 12 of container 10, and a cylindrical neck 28 that is subsequently expanded to form neck 22 of container 12. In FIG. 2B, preform body 26 has been blow molded to form container body 12, while neck 28 has retained the same geometry as in preform 24. In FIG. 2C, neck 28 has been radially and circumferentially expanded to form final container neck 22. Such radial and circumferential expansion can be accomplished employing any suitable means, such as an expansion cone or chuck, and maybe accomplished in single or multiple steps. In FIG. 2D, finish ring 14 is secured over expanded container neck 22. Such finish ring securement can be by interference fit, such as interference press fit or interference shrink fit, by adhesive, by ultrasonic welding or by other suitable technique.

Figure 3B:
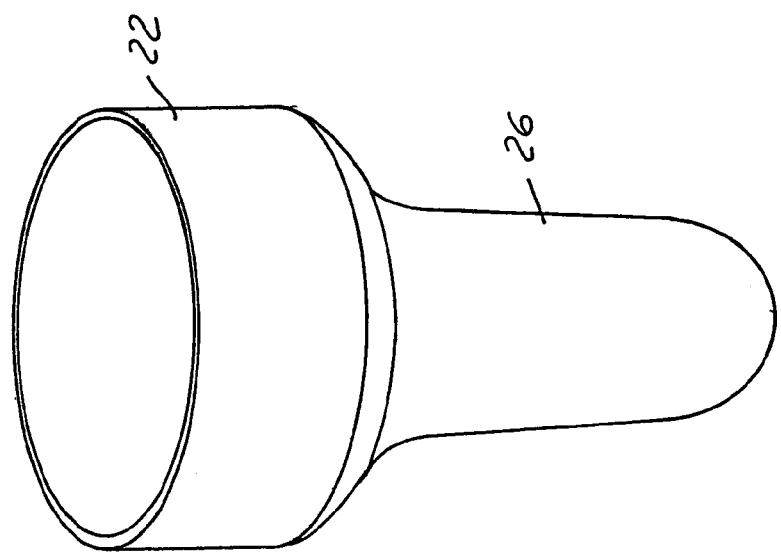
Figure 3A:
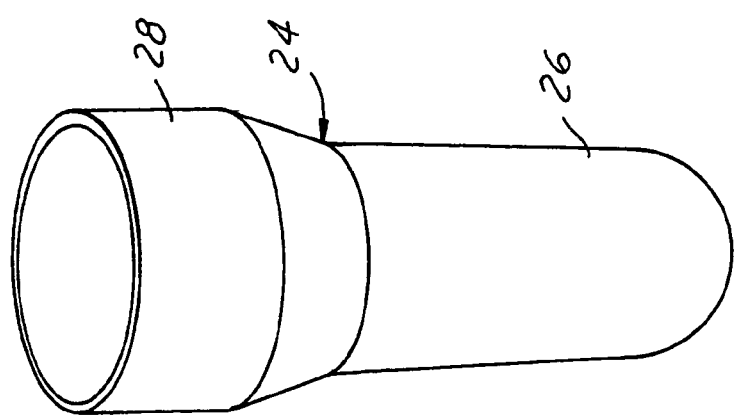

FIGS. 3A-3C illustrate another method of container fabrication. Once again, preform 24 is initially formed in FIG. 3A. However, in this embodiment, preform neck 28 is radially and circumferentially expanded to form container neck 22 prior to blow molding container body 12. Finish ring 14 is then externally secured to expanded preform neck 22 in FIG. 3C, and the preform body is blow molded to form the container body as in FIG. 2B. Finish ring 14 could alternatively be secured to expanded neck 22 subsequent to blowing the container body.

Preform 24 may be of any suitable plastic construction, such as monolayer PET or a multilayer construction of PET layers alternating with layers of barrier resin such as ethylene vinyl alcohol (EVOH) or nylon. Preform 24 may be injection molded or compression molded. Likewise, finish ring 14 may be of injection or compression molded plastic construction. By providing finish ring 14 separate from preform 24, finish ring 14 may be of any desired material construction, either the same as or more preferably different from the material construction of the preform. For example, the finish ring can be of PET, post consumer resin (PCR), process regrind (REG), polypropylene (PP), polyethylene (PE) or polyethylene naphthalate (PEN) construction. Where the finish ring is of polyester construction (e.g., PET, PEN or process regrind), the finish ring may be wholly or partially crystallized as molded. This may be accomplished by employing fast-crystallizing materials or suitably setting process conditions for manufacture of the finish ring, such as high mold temperature, slow mold cooling, heated areas in the mold cavity, etc. The finish ring alternatively may be wholly or partially crystallized in a post-molding operation. In other words, the material and conditions of fabrication of the finish ring may be selected separately from the material and manufacturing conditions of the preform to achieve desired operating characteristics at the finish area of the preform and the final container. Furthermore, the preform can be molded with thin wall sections without having to accommodate flow of material into a thicker finish area, which reduces material cost and mold cycle time. The finish ring and/or the preform neck can be provided with suitable means for preventing rotation of the ring on the neck.

In accordance with the present invention, neck 22 is at least partially of crystallizable polymer construction, and is at least partially crystallized after expansion but before securement of finish ring 14. Crystallization of neck 22 may be carried out after blow molding the container body (FIG. 2G), or prior to blow molding the container body (FIG. 3B). Such crystallization can be carried out in any suitable manner, including for example directing heat from a quartz lamp onto the area of the neck to be crystallized. Heat shields can be used to prevent crystallization in areas of the neck and/or the preform or container body where crystallization is not desired. A heated plug can be inserted into the expanded neck. Crystallization can be entirely through the radial thickness of the expanded neck, or may be concentrated on the internal and/or external surface of the neck. Likewise, crystallization can be entirely through the axial length of the neck, or can be concentrated in selected axial areas of the neck. Crystallization can be graded or non-graded as desired. Crystallization in neck 22 helps maintain the geometry of the neck prior to and subsequent to assembly of finish ring 14 to the neck.

Figures 4, 4A:
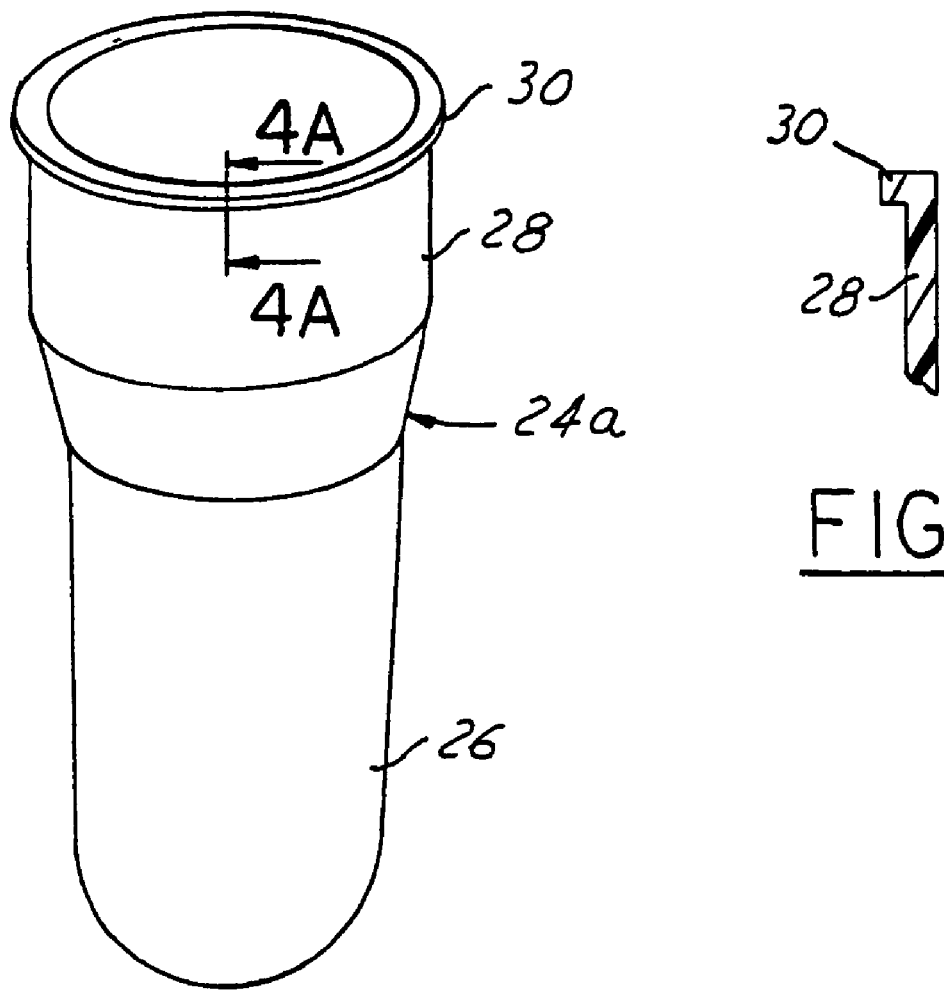
FIG. 4 is a perspective view of a preform in accordance with a modified embodiment of the invention.
FIG. 4A is a fragmentary sectional view of the portion of FIG. 4 within the circle 4A.

FIG. 4 illustrates a modified preform 24a, which is the same as preform 24 in FIGS. 2A and 3A, but has a lip or flange 30 that extends radially outwardly from the open upper edge of neck 28. When assembling finish ring 14 to preform 24a, after expansion of the preform neck as shown in FIG. 3C, lip 30 (which is expanded with the preform neck) functions as an abutment stop for the finish ring. When assembling finish ring 14 to container 12 as shown in FIG. 2D, ring 14 is expanded radially outwardly over lip 30 using a mandrel or the like, as described for example in U.S. application Ser. No. 10/375,736 filed Feb. 26, 2003 and assigned to the assignee of the present application.

There have thus been disclosed a container assembly, a preform assembly, and methods of making the container and preform assemblies that fully satisfy all of the objects and aims previously set forth. The invention has been disclosed in conjunction with two presently preferred embodiments thereof, and other modifications and variations have been discussed. Additional modifications and variations will readily suggest themselves to persons of ordinary skill in the art. The invention is intended to embrace all such modifications and variations as fall within the spirit and broad scope of the appended claims.

The invention claimed is:

1. A finish on a hollow plastic preform or container having an integral body, said finish including:
a neck integrally molded with said body, said neck being circumferentially expanded to orient said neck subsequent to molding and being at least partially crystallized by subjecting said neck to heating subsequent to expansion to form an expanded and crystallized neck, and
a finish ring externally secured to said expanded and crystallized neck, said finish ring having at least one external thread or bead for securement of a closure.

2. The finish set forth in claim 1 wherein said finish ring is externally secured to said neck by interference fit, adhesive or welding.

3. The finish set forth in claim 1 wherein said finish ring is of a different plastic material construction from said neck.

4. The finish set forth in claim 1 wherein said expanded neck is at least partially molecularly oriented.

5. The finish set forth in claim 1 wherein said preform or container is a multilayer preform or container including one or more of a barrier material, regrind, and post-consumer resin.

6. The finish set forth in claim 1 wherein said finish ring has one or more external threads or thread segments.

7. The finish set forth in claim 1 wherein said finish is on an injection molded or compression molded preform.

8. The finish set forth in claim 1 wherein said finish ring is of injection or compression molded plastic construction.

9. The finish set forth in claim 1, wherein said finish ring comprises one or more of polyester, PET, post-consumer resin, process regrind, polypropylene, polyethylene, and polyethylene naphthalate.

10. The finish set forth in claim 1 wherein the finish ring is wholly or partially crystallized.

11. The finish set forth in claim 1 wherein the crystallized neck comprises one or more of: crystallization entirely through a radial thickness of the neck, crystallization concentrated on an internal and/or external surface of the neck, crystallization entirely through an axial length of the neck, crystallization concentrated in selected axial areas of the neck, and graded or non-graded crystallization.

12. The finish set forth in claim 1 wherein said neck is at least partially of a crystallizable polymer.

13. The finish set forth in claim 12 wherein said crystallizable polymer comprises one or more of polyester, PET, polyolefin, polyethylene, polypropylene, polycarbonate, polyamide, and nylon.

14. A method of making a finish on a hollow plastic preform or container, which includes the steps of:
   (a) providing a molded plastic neck that is at least partially of crystallizable polymer construction,
   (b) circumferentially expanding said neck to orient said neck,
   (c) at least partially crystallizing said neck by subjecting said neck to heating after expansion in said step (b), and
   (d) securing a finish ring externally over said neck subsequent to said step (c).

15. The method set forth in claim 14 wherein said finish ring is externally secured to said neck by interference fit, adhesive or welding.

16. The method set forth in claim 14 wherein said plastic finish ring is of a different material construction from said neck.

17. The method set forth in claim 14 wherein said expanded neck is at least partially molecularly oriented during said expanding step.

18. The method set forth in claim 14 wherein said preform or container is a multilayer preform or container including one or more of a barrier material, regrind, and post-consumer resin.

19. The method set forth in claim 14 wherein said finish ring has one or more external threads or thread segments.

20. The method set forth in claim 14 wherein said finish is on a blow-molded container made from an injection molded or compression molded preform.

21. The method set forth in claim 14 wherein said finish ring is of injection or compression molded plastic construction.

22. The method set forth in claim 14 wherein said finish ring comprises one or more of polyester, PET, post-consumer resin, process regrind, polypropylene, polyethylene, and polyethylene naphthalate.

23. The method set forth in claim 14 wherein the finish ring is wholly or partially crystallized.

24. The method set forth in claim 14 wherein the crystallized neck comprises one or more of: crystallization entirely through a radial thickness of the neck, crystallization concentrated on an internal and/or external surface of the neck, crystallization entirely through an axial length of the neck, crystallization concentrated in selected axial areas of the neck, and graded or non-graded crystallization.

25. The method set forth in claim 14 wherein said neck is at least partially of a crystallizable polymer.

26. The method set forth in claim 25 wherein said crystallizable polymer comprises one or more of polyester, PET, polyolefin, polyethylene, polypropylene, polycarbonate, polyamide, and nylon.

27. A method of making a plastic container having a body and a finish with at least one external thread, which includes the steps of:
   (a) providing a plastic preform having a body and a neck,
   (b) blow molding said body of said preform to form the body of the container,
   (c) either prior to or subsequent to said step (b), expanding said preform neck to orient said neck,
   (d) at least partially crystallizing said neck by subjecting said neck to heating subsequent to said step (c),
   (e) providing a plastic finish ring having at least one external thread, and
   (f) securing said finish ring to an external surface of said neck after expansion of said neck in said step (c), and either prior to or subsequent to said step (b).

28. The method set forth in claim 27 wherein said expanded neck is at least partially molecularly oriented during said expanding step.

29. The method set forth in claim 27 wherein said container is a multilayer container including one or more of a barrier material, regrind, and post-consumer resin.

30. The method set forth in claim 27 wherein said finish ring has one or more external threads or thread segments.

31. The method set forth in claim 27 wherein said finish is on an injection molded or compression molded preform.

32. The method set forth in claim 27 wherein said finish ring is of injection or compression molded plastic construction.

33. The method set forth in claim 27, wherein said finish ring comprises one or more of polyester, PET, post-consumer resin, process regrind, polypropylene, polyethylene, and polyethylene naphthalate.

34. The method set forth in claim 27 wherein the finish ring is wholly or partially crystallized.

35. The method set forth in claim 27 wherein the crystallized neck comprises one or more of: crystallization entirely through a radial thickness of the neck, crystallization concentrated on an internal and/or external surface of the neck, crystallization entirely through an axial length of the neck, crystallization concentrated in selected axial areas of the neck, and graded or non-graded crystallization.

36. The method set forth in claim 27 wherein said neck is at least partially of a crystallizable polymer.

37. The method set forth in claim 36 wherein said crystallizable polymer comprises one or more of polyester, PET, polyolefin, polyethylene, polypropylene, polycarbonate, polyamide, and nylon.

38. A method of making a preform assembly for blow molding a container, which includes the steps of:
   (a) providing a molded plastic preform having a body and a cylindrical neck with an external surface,
   (b) expanding said preform neck to orient said neck,
   (c) at least partially crystallizing said neck by subjecting said neck to heating subsequent to said step (b),
   (d) providing a molded plastic finish ring, and
   (e) securing said finish ring to the external surface of the preform neck after expansion in said step (b) and crystallization in said step (c).

39. The method set forth in claim 38 wherein said expanded neck is at least partially molecularly oriented during said expanding step.

40. The method set forth in claim 38 wherein said preform is a multilayer preform including one or more of a barrier material, regrind, and post-consumer resin.

41. The method set forth in claim 38 wherein said finish ring has one or more external threads or thread segments.

42. The method set forth in claim 38 wherein said finish is on an injection molded or compression molded preform.

43. The method set forth in claim 38 wherein said finish ring is of injection or compression molded plastic construction.

44. The method set forth in claim 38 wherein said finish ring comprises one or more of polyester, PET, post-consumer resin, process regrind, polypropylene, polyethylene, and polyethylene naphthalate.

45. The method set forth in claim 38 wherein the finish ring is wholly or partially crystallized.

46. The method set forth in claim 38 wherein the crystallized neck comprises one or more of: crystallization entirely through a radial thickness of the neck, crystallization concentrated on an internal and/or external surface of the neck, crystallization entirely through an axial length of the neck, crystallization concentrated in selected axial areas of the neck, and graded or non-graded crystallization.

47. The method set forth in claim 38 wherein said neck is at least partially of a crystallizable polymer.

48. The method set forth in claim 47 wherein said crystallizable polymer comprises one or more of polyester, PET, polyolefin, polyethylene, polypropylene, polycarbonate, polyamide, and nylon.

* * * * *